US010838750B2

(12) United States Patent
Ferraro et al.

(10) Patent No.: US 10,838,750 B2
(45) Date of Patent: Nov. 17, 2020

(54) COMBINING AHEAD-OF-TIME COMPILATION AND JUST-IN-TIME COMPILATION TO IMPROVE APPLICATION DEPLOYMENT (71) Applicant: Red Hat, Inc., Raleigh, NC (US)

(72) Inventors: Nicola Ferraro, Rome (IT); Luca Burgazzoli, Piacenza (IT)

(73) Assignee: Red Hat, Inc., Raleigh, NC (US)

( * ) Notice: Subject to any disclaimer, the term of this patent is extended or adjusted under 35 U.S.C. 154(b) by 0 days.

(21) Appl. No.: 16/244,647

(22) Filed: Jan. 10, 2019

(65) Prior Publication Data
US 2020/0225968 A1 Jul. 16, 2020

(51) Int. Cl.
G06F 9/44 (2018.01)
G06F 9/455 (2018.01)

(52) U.S. Cl.
CPC ........ G06F 9/4552 (2013.01); G06F 9/45558 (2013.01); G06F 2009/45575 (2013.01)

(58) Field of Classification Search
CPC .............. G06F 9/4552; G06F 9/45558; G06F 2009/45575
USPC .................................... 717/139–148
See application file for complete search history.

(56) References Cited

U.S. PATENT DOCUMENTS

| 7,213,240 | B2  |   | 5/2007 | Wong et al.      |              |
|-----------|-----|---|--------|------------------|--------------|
| 7,587,712 | B2  |   | 9/2009 | Mountain et al.  |              |
| 7,941,792 | B2  | * | 5/2011 | Tromey           | G06F 9/44589 |
|           |     |   |        |                  | 717/126      |
| 7,996,826 | B2  | * | 8/2011 | Park             | G06F 9/45516 |
|           |     |   |        |                  | 717/148      |
| 8,959,495 | B2  |   | 2/2015 | Chafi et al.     |              |
| 9,766,867 | B2  |   | 9/2017 | Yang et al.      |              |
| 2005/0160415 | A1 | * | 7/2005 | Kwon         | G06F 9/45504 |
|           |     |   |        |                  | 717/151      |
| 2015/0178054 | A1 | * | 6/2015 | Delsart      | G06F 9/45533 |
|           |     |   |        |                  | 717/106      |

OTHER PUBLICATIONS

Wang et al., "A Method-Based Ahead-of-Time Compiler for Android Applications", 2011, ACM, pp. 15-24 (Year: 2011).*
Stoodley et al, "Real-time Java, Part 2—Comparing compilation techniques", 2017, IBM Developer, 22 pages (Year: 2017).*
Cesar Tron-Lozai, "Docker and The JVM", 2018, JVM Advent, https://www.javaadvent.com/ , 9 pages (Year: 2018).*

(Continued)

*Primary Examiner* — Ted T. Vo
(74) *Attorney, Agent, or Firm* — Kilpatrick Townsend & Stockton LLP (57) ABSTRACT

Ahead-of-time (AOT) and just-in-time (JIT) compilation can be combined to improve application deployment. For example, an application can be deployed in a first container for responding to requests associated with the application. The first container is configured to execute the application at least in part by performing JIT compilation. While the application is deployed within the first container, program code for the application can be compiled in a second container by performing AOT. Based on determining that AOT compilation is complete, a system can be configured to respond to subsequent requests associated with the application by executing the machine code.

20 Claims, 4 Drawing Sheets (56) References Cited

OTHER PUBLICATIONS

Paul-Adrien Cordonnier, "Nobody* puts Java in a Container", 2017, Adaltas, https://www.adaltas.com , 4 page (Year: 2017).*

Kandu, R., et al., Android: Tthe Road to JIT/AOT Hybrid Compilation-Based Application User Experience, Intel, May 20, 2016, https://software.intel.com/en-us/articles/android-the-road-to-jitaot-hybrid-compilation-based-application-user-experience.

Caamano, J.M.M and Guelton, S., Easy: : JIT: Compiler Assisted Library to Enable Just-in-Time Compilation in C++ Codes, Allen Institute for Artificial Intelligence, 2018, https://www.semanticscholar.org/paper/Easy%3A-%3A-Jit%3A-compiler-assisted-library-to-enable-in-Caama%C3%810-Guelton/7b348d1a6c534a34aa90d4a8ca01dcba00aba161.

Oh, H., et al., Hybrid Java Compilation of Just-In-Time and Ahead-of Time for Embedded Systems, Journal of Circuits, Systems and Computers, Jan. 23, 2011, https://www.researchgate.net/publication/263802226_hybrid_jaca_compilation_of_just-in-time_and_ahead-of_time_for_embedded_systems.

* cited by examiner

COMBINING AHEAD-OF-TIME COMPILATION AND JUST-IN-TIME COMPILATION TO IMPROVE APPLICATION DEPLOYMENT

TECHNICAL FIELD

The present disclosure relates generally to application deployment. More specifically, but not by way of limitation, this disclosure relates to combining ahead-of-time compilation and just-in-time compilation to improve application deployment.

BACKGROUND

Compilers translate source code into machine code (or "native code") that can be directly executed by a processing device, such as a central processing unit. There are two general approaches to compiling source code. One approach is ahead-of-time compilation, in which the source code for an application is translated into machine code before the application is executed (i.e., prior to runtime). This is a relatively static process, in which the machine code remains fixed once created. Another approaching to compiling source code is just-in-time compilation, in which the source code for an application is first compiled into intermediary code, such as bytecode or bitcode. Then a just-in-time compiler dynamically converts the intermediary code into machine code on-the-fly while the application is executed (i.e., during runtime). This is a more dynamic process, in which the runtime environment can provide feedback to the just-in-time compiler in order to optimize the machine code based on the current state of the application.

DETAILED DESCRIPTION

Ahead-of-time (AOT) compilation and just-in-time (JIT) compilation each have their own advantages and disadvantages. For example, JIT compilation is more dynamic than AOT compilation and consequently results in machine code that is better optimized for the runtime environment. But JIT compilation must be implemented within the context of a special compilation environment, such as on a Java virtual machine (JVM) with specific libraries and tools required to perform JIT compilation. This type of compilation environment takes a relatively long time to startup, resulting in significant delays in initially deploying an application. In contrast, AOT compilation results in machine code that is immediately executable by a processing device. There is no need for a special compilation environment, so the startup delays associated with JIT compilation are avoided. But AOT compilation is a significantly slower (e.g., up to 10 times slower) process than JIT compilation, and the machine code generated therefrom is not executable until the process has entirely completed.

Some examples of the present disclosure overcome some or all of the above problems by initially deploying an application using JIT compilation while performing AOT compilation in the background, and then once AOT compilation is complete, deploying subsequent instances of the application using the AOT-compiled machine code. This leverages the benefits of both approaches while avoiding the disadvantages of each, thereby dramatically reducing system latency and improving overall performance.

As a specific example, a system of the present disclosure can receive source code for an application to be deployed in a computing environment. The application can be a Java application. In order to make the application quickly available for use in the computing environment, the system can deploy and execute the application in a first container using JIT compilation. Since the startup delay associated with JIT compilation is less than the total amount of time required to complete AOT compilation, executing the application in the first container using JIT compilation is a faster approach than waiting until AOT compilation is complete to initially deploy the application.

Once the application is deployed in the first container, the system can initiate AOT compilation of the source code in a second container (e.g., a background container). With this arrangement, the application is available for use in the first container, while AOT compilation is ongoing in the second container.

At some point in the future, the system can determine that AOT compilation is complete. Based on determining that AOT compilation is complete, the system can configure itself to deploy future instances of the application using the AOT-compiled machine code. This can ensure that future instances of the application are deployed faster than is achievable using JIT compilation.

For example, the system can detect that the application executing in the first container has remained unused for a predefined period of time, such as 20 minutes. Since the application has not been recently used, the system can shut down the first container in order to conserve computing resources (e.g., memory, processing power, etc.). This process can be referred to as "scaling down." After scaling down, the system can receive a request to use some aspect of the application at a future point in time. The system can respond to the request by redeploying the application in a new container using the AOT-compiled machine code, which requires minimal startup time.

In the above example, the application is initially executed using JIT compilation, which is faster than waiting for AOT compilation to complete. This provides the fastest initial access to the application. Then, once AOT compilation is complete, the application is subsequently executed using the AOT-compiled machine code. This provides the fastest subsequent access to the application. By using both approaches together, the system can minimize the impact of the latencies involved in using either approach alone to provide faster overall access to the application.

These illustrative examples are given to introduce the reader to the general subject matter discussed here and are not intended to limit the scope of the disclosed concepts. The following sections describe various additional features and examples with reference to the drawings in which like numerals indicate like elements but, like the illustrative examples, should not be used to limit the present disclosure.

Figure 1:
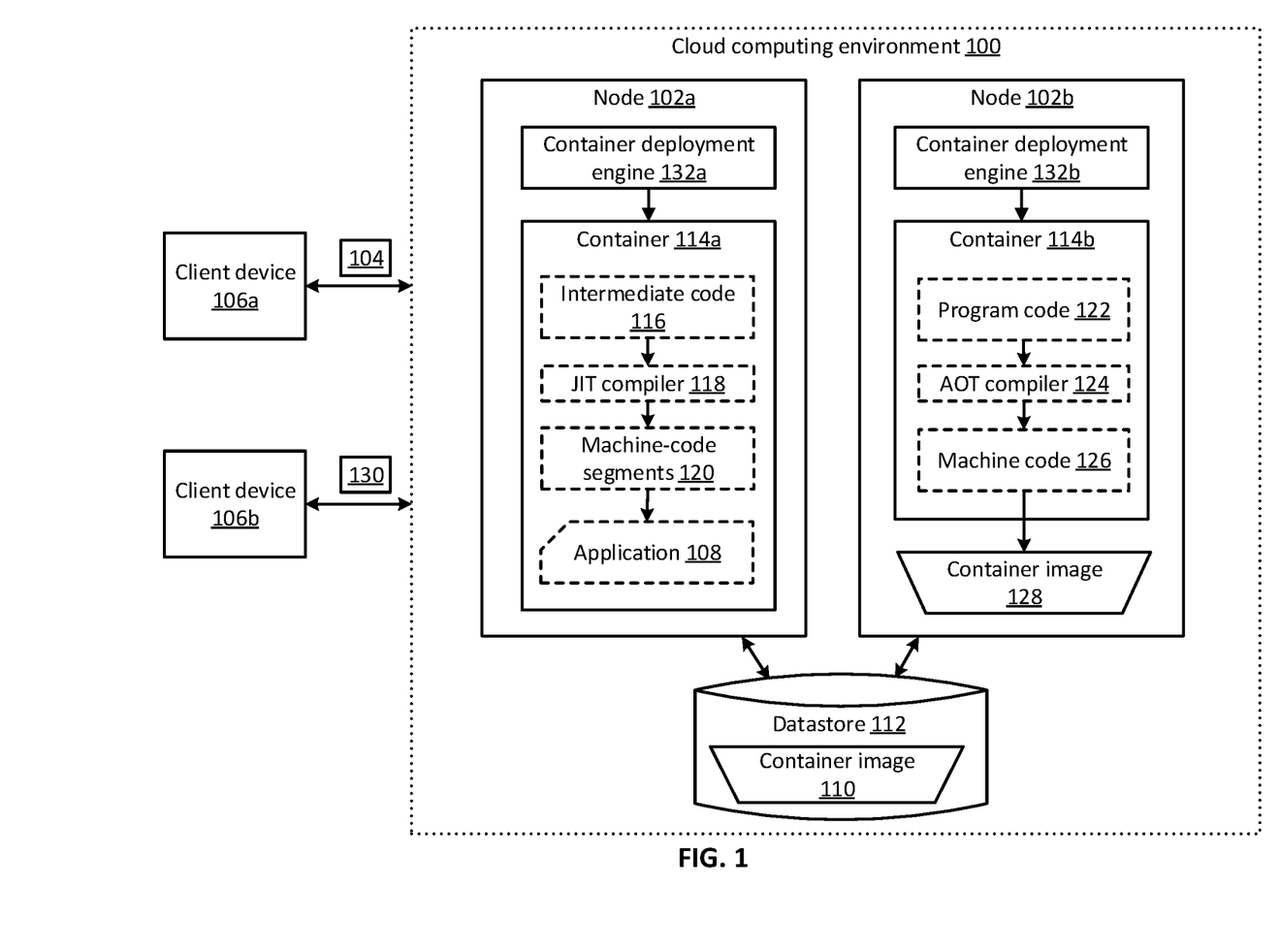
FIG. 1 is a block diagram of an example of a system for combining ahead-of-time (AOT) compilation and just-in-time (JIT) compilation according to some aspects.

FIG. 1 is a block diagram of an example of a system for combining AOT compilation and JIT compilation according to some aspects. The system includes a cloud computing environment 100, which can include a private cloud, public cloud, or a hybrid thereof. The cloud computing environment 100 is formed from multiple nodes 102a-b (e.g., virtual machines, servers, or other computing devices), which may or may not be in communication with one another.

In some examples, the cloud computing environment 100 can receive a deployment request 104 from a client device 106a to deploy an application 108 in the cloud computing environment 100. The cloud computing environment 100 can respond to the deployment request 104 by obtaining a container image 110a associated with the application 108 from a datastore 112 (e.g., a hard disk or other memory device). The cloud computing environment 100 can then deploy a container 114a on the node 104a from the container image 110 using a container deployment engine 132a, such as Docker™. The container 114a can include intermediate code 116 for the application 108 and a JIT compiler 118. The container 114a can run the JIT compiler 118 to dynamically convert specific portions of the intermediate code 116 associated with particular application functionality into corresponding machine-code segments 120 executable on-the-fly to implement that application functionality. In this manner, the cloud computing environment 100 can respond to requests associated with the application 108 (e.g., from client devices 106a-b) using the instance of the application 108 executing in container 114a.

Concurrently with (or shortly after) deploying the application 108 in the container 114a, the cloud computing environment 100 can also generate another container 114b on another node 102b. For example, node 102b can deploy the container 114b from another container image using the container deployment engine 132b. The container 114b can be a temporary, task-focused container that executes in as a background process such that it is hidden from client devices 106a-b external to the cloud computing environment 100. The container 114b can include program code 122 for the application 108 and an AOT compiler 124. Examples of the program code 122 can include source code or intermediate code. The container 104b can initiate the AOT compiler 124 to convert the program code 122 into machine code 126, which will be a fully compiled version of the program code 122 capable of being directly loaded and executed by a processing device of a node in the cloud computing environment 100.

After initiating AOT compilation in the container 114b, the cloud computing environment 100 can monitor incoming requests associated with the application 108. Examples of the requests can include requests for the application to implement one or more predefined functions. If the cloud computing environment 100 determines that there have not been any requests associated with the application 108 within a predetermined time interval, such as one hour, the cloud computing environment 100 can check to see if AOT compilation is complete. For example, the cloud computing environment 100 can check to see if the machine code 126 is available, which would indicate that AOT compilation is complete. If the cloud computing environment 100 determines the AOT compilation is incomplete, the cloud computing environment 100 can continue to execute the application 108 in container 114a and route any incoming requests to that container 114a, so that application 108 is immediately available to handle the incoming requests. The cloud computing environment 100 can iterate this process, periodically checking on the status of the AOT compilation until AOT compilation is complete.

If the cloud computing environment 100 determines that the AOT compilation it complete, the cloud computing environment 100 can shut down the container 114a, container 114b, or both. This may to conserve computing resources associated with the containers 114a-b. Additionally or alternatively, the cloud computing environment 100 can generate a container image 128 that has the machine code 126. For example, node 102b can use the container deployment engine 132b to generate container image 128, which has the machine code. The cloud computing environment 100 can then configure itself to deploy future instances of the application 108 using the container image 128, rather than container image 110. For example, the cloud computing environment 100 can overwrite the container image 110 in the datastore 112 with the other container image 128.

At a future point in time, the cloud computing environment 100 can receive a request 130 associated with the application 108 from a client device 106b. Based on the request 130, the cloud computing environment 100 can deploy a new instance of the application 108 in a new container using the container image 128 with the machine code 126. For example, node 102a can deploy the new container by using the container image 128 with the container deployment engine 132a. The cloud computing environment 100 can then use the instance of the application 108 deployed in the new container to handle the request 130.

While the example shown in FIG. 1 has a certain number and arrangement of components, this is merely illustrative and other arrangements are possible. For example, while FIG. 1 depicts two nodes 102a-b, the cloud computing environment 100 can include any number and combination of nodes. As another example, while FIG. 1 depicts two client devices 106a-b that are external to the cloud computing environment 100, other examples can include any number and combination of client devices that are internal or external to the infrastructure of the cloud computing environment 100. As yet another example, while FIG. 1 depicts the containers 114a-b being implemented on separate nodes, in other examples both containers 114a-b can be implemented on the same node, such as node 102a. As yet another example, while FIG. 1 depicts the datastore 122 as being separate from the nodes 102a-b, in other examples the datastore 112 may be included in at least one of the nodes 102a-b.

Figure 2:
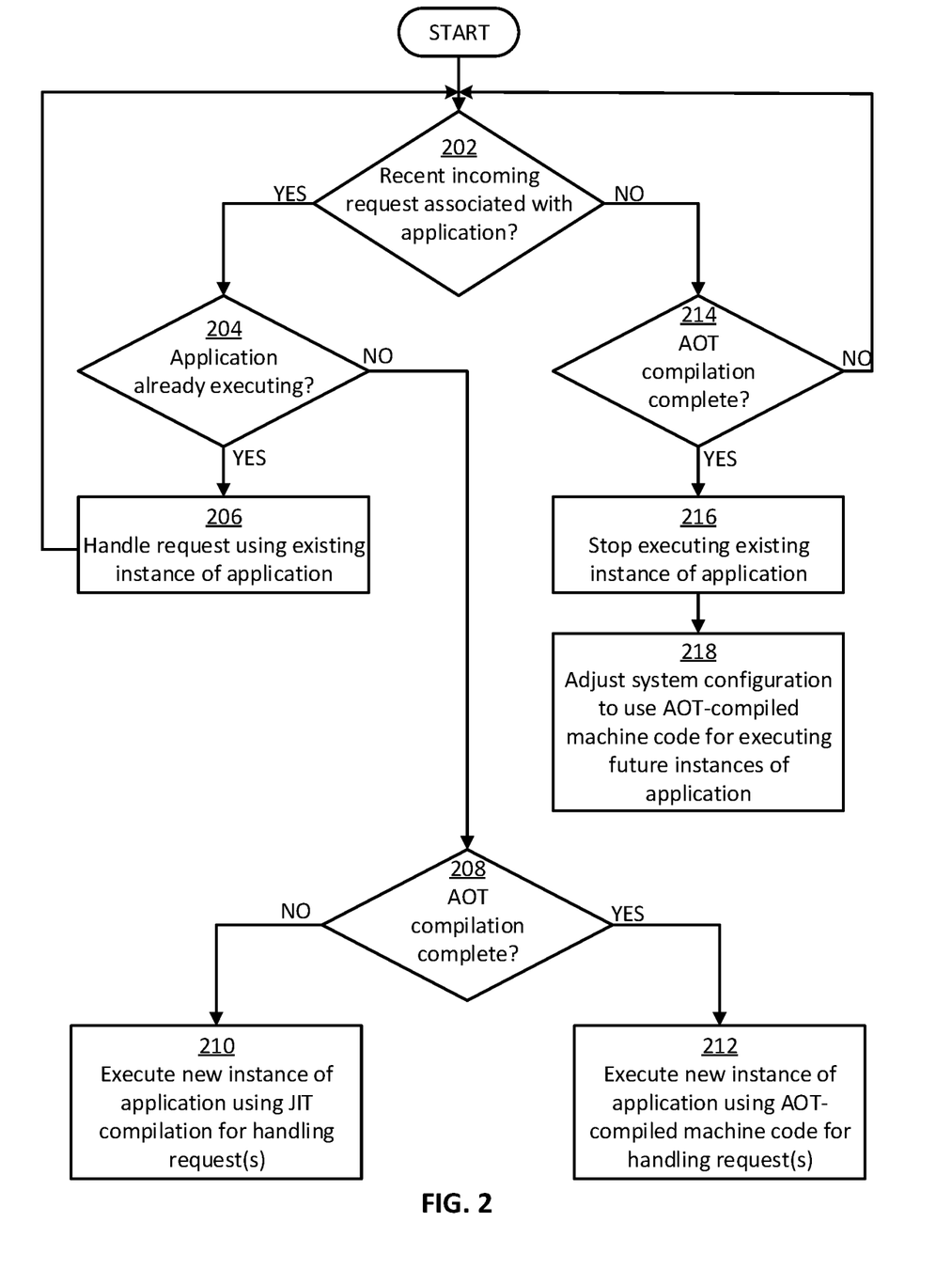
FIG. 2 is a flow chart of an example of a process for combining AOT compilation and JIT compilation according to some aspects.

FIG. 2 is a flow chart of an example of a process for combining AOT compilation with JIT compilation according to some aspects. Other examples can include more steps, fewer steps, different steps, or a different order of the steps than is shown in FIG. 2. The phrase "a processing device" as used below (and elsewhere herein) can mean one processing device or multiple processing devices.

In block 202, a processing device (e.g., of node 102a in FIG. 1) determines if there is has been any incoming requests associated with an application within a predetermined time interval. If so, the process continues to block 204.

In block 204, the processing device determines if the application is already executing (e.g., via JIT compilation within container 114a of FIG. 1). If the processing device determines that the application is already executing, the process continues to block 206, in which the processing device can handle the incoming request(s) using the existing instance of the application that is already executing. This can minimize the amount of time it takes to handle such requests. If the processing device determines that the application is not already executing, the process continues to block 208.

In block 208, the processing device determines if AOT compilation is complete. If AOT compilation is not complete, the process proceeds to block 210, in which the processing device can execute a new instance of the application using JIT compilation to handle the request(s). For example, the processing device can deploy a new instance of the application in a new container and execute the new instance using JIT compilation. If AOT compilation is complete, the process proceeds to block 212, in which the processing device can execute a new instance of the application using the AOT-compiled machine code to handle the request(s). For example, the processing device can deploy a new instance of the application in a new container and execute the new instance using the AOT-compiled machine code.

Returning back to block 202, if the processing device determines that there has not been any incoming requests associated with an application within the predetermined time interval, the process continues to block 214. In block 214, the processing device determines if AOT compilation is complete. If AOT compilation is not complete, the process returns to block 202. Otherwise, the process proceeds to block 216, in which the processing device stops executing the existing instance of the application. For example, the processing device can shut down an existing container running an existing instance of the application. The process then proceeds to block 218, in which the processing device adjusts a system configuration such that the AOT-compiled machine code is used to execute some or all future instances of the application. This can minimize the amount of time it takes to handle future requests.

Some or all of the process shown in FIG. 2 can iterate as needed. For example, after any of blocks 210, 212, or 218, the process can return to block 202 and iterate.

Figure 3:
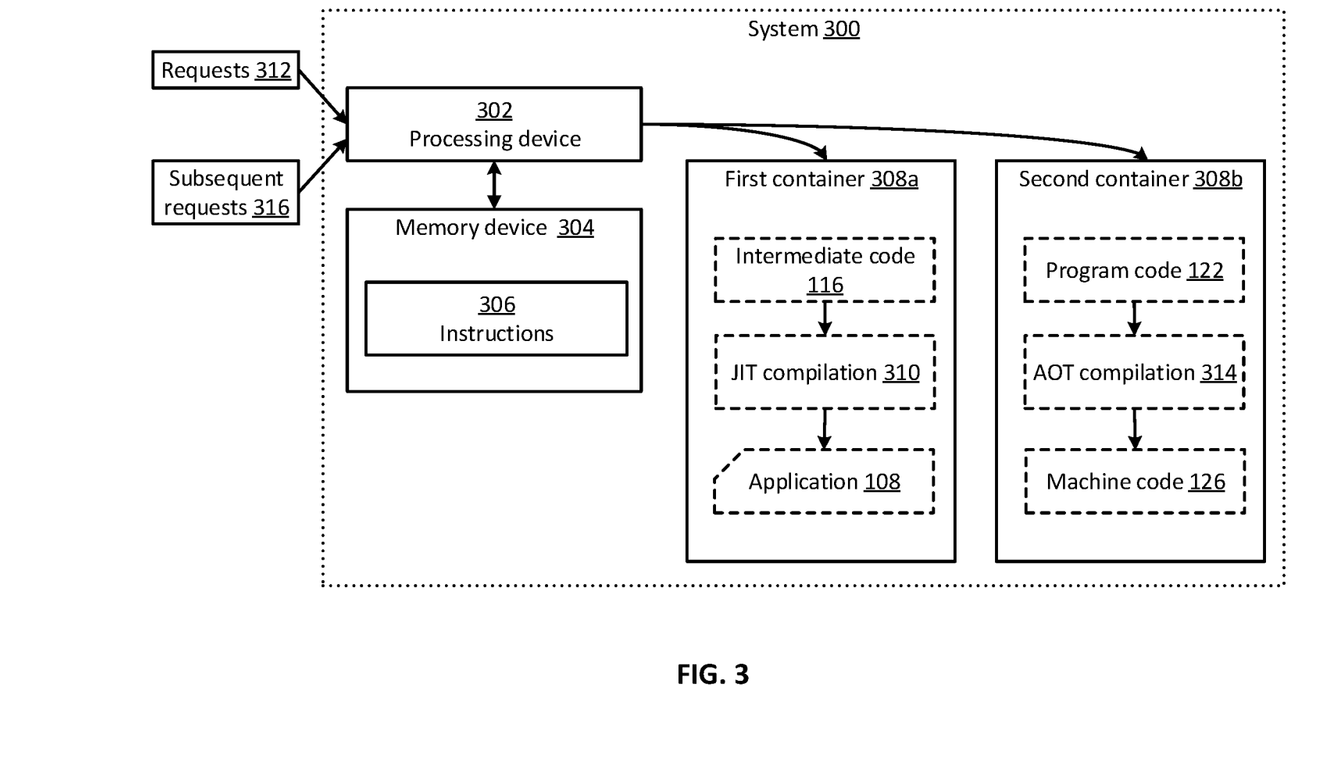
FIG. 3 is a block diagram of another example of a system for combining AOT compilation and JIT compilation according to some aspects.

FIG. 3 is a block diagram of another example of a system 300 for combining AOT compilation and JIT compilation according to some aspects. The system 300 includes a processing device 302 communicatively coupled with a memory device 304. The processing device 302 can include one processing device or multiple processing devices. Non-limiting examples of the processing device 302 include a Field-Programmable Gate Array (FPGA), an application-specific integrated circuit (ASIC), a microprocessor, etc. The processing device 302 can execute instructions 306 stored in the memory device 304 to perform operations. In some examples, the instructions 306 can include processor-specific instructions generated by a compiler or an interpreter from code written in any suitable computer-programming language, such as C, C++, C #, etc.

The memory device 304 can include one memory device or multiple memory devices. The memory device 304 can be non-volatile and may include any type of memory device that retains stored information when powered off. Non-limiting examples of the memory device 304 include electrically erasable and programmable read-only memory (EE-PROM), flash memory, or any other type of non-volatile memory. In some examples, at least some of the memory device can include a medium from which the processing device 302 can read instructions 306. A computer-readable medium can include electronic, optical, magnetic, or other storage devices capable of providing the processing device 302 with computer-readable instructions or other program code. Non-limiting examples of a computer-readable medium include magnetic disk(s), memory chip(s), ROM, random-access memory (RAM), an ASIC, a configured processor, optical storage, or any other medium from which a computer processor can read the instructions 306.

In some examples, the processing device 302 can generate a first container 308a and deploy an application 108 in the first container 308a. The application 108 can be used to respond to requests 312 associated with the application 108. The first container 308a can execute the application 108 at least in part by performing JIT compilation 310 on the intermediate code 116.

After generating (or concurrently with generating) the first container 308a, the processing device 302 can also generate a second container 308b. The processing device 302 can then begin compiling program code 122 for the application 108 in the second container 308b by performing AOT compilation 314, in which the program code 122 is compiled into machine code 126.

At a future point in time, processing device 302 can check to see if the AOT compilation 314 is complete. Based on determining that AOT compilation 314 is complete, the processing device 302 can configure the system 300 to respond to subsequent requests 316 associated with the application 108 by executing the machine code 126 rather than by performing JIT compilation 310.

Figure 4:
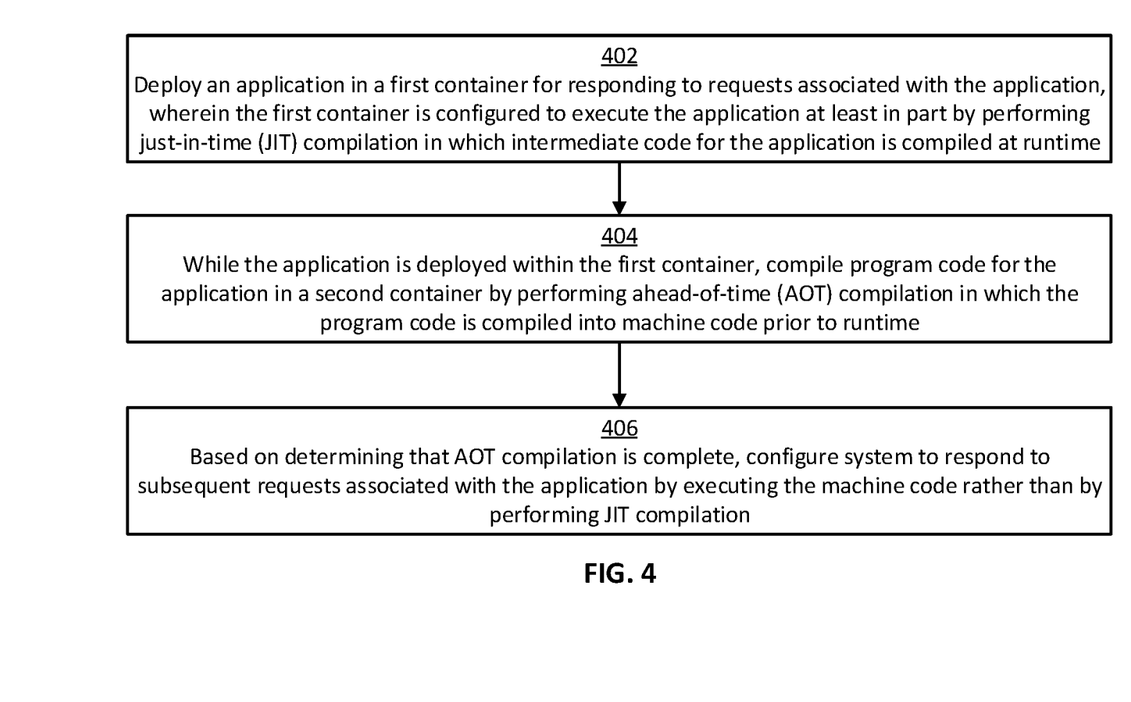
FIG. 4 is a flow chart of another example of a process for combining AOT compilation and JIT compilation according to some aspects.

In some examples, the processing device 302 can implement some or all of the steps shown in FIG. 4. Other examples can include more steps, fewer steps, different steps, or a different order of the steps than is shown in FIG. 4. The steps of FIG. 4 are discussed below with reference to the components discussed above in relation to FIG. 3.

In block 402, a processing device 302 deploys an application 108 in a first container 308a for responding to requests 312 associated with the application 108. This can involve using a container deployment engine to deploy the first container 308 and executing the application 108 within the first container 308a at least in part by performing JIT compilation 310, in which intermediate code 116 for the application 108 is compiled at runtime.

In block 404, the processing device 302 compiles program code 122 for the application 108 in a second container 308b while the application 108 is deployed within the first container 308a. The processing device 302 can compile the program code 122 at least in part by performing AOT compilation 314 in which the program code 122 is compiled into machine code 126 prior to runtime.

In block 406, the processing device 302 configures a system 300 to respond to subsequent requests 316 associated with the application 108 by executing the machine code 126 (e.g., rather than by performing JIT compilation 310). The processing device 302 can configure the system 300 in this manner based on determining that AOT compilation 314 is complete.

In some examples, configuring the system 300 can involve adjusting a setting or parameter of the system. Additionally or alternatively, configuring the system 300 can include overwriting one or more existing files (e.g., container image 110 of FIG. 1) in the system 300 with another file (e.g., container image 128 of FIG. 1).

The foregoing description of certain examples, including illustrated examples, has been presented only for the purpose of illustration and description and is not intended to be exhaustive or to limit the disclosure to the precise forms disclosed. Numerous modifications, adaptations, and uses thereof will be apparent to those skilled in the art without departing from the scope of the disclosure. For instance, any example(s) described herein can be combined with any other example(s) to yield further examples.

The invention claimed is:

1. A system comprising:
a processing device; and
a memory device including instructions that are executable by the processing device for causing the processing device to:
deploy an application in a first container for responding to requests associated with the application, wherein the first container is configured to execute the application at least in part by performing just-in-time (JIT) compilation in which intermediate code for the application is compiled at runtime;
while the application is deployed within the first container, compile program code for the application in a second container by performing ahead-of-time (AOT) compilation in which the program code is compiled into machine code prior to runtime; and
based on determining that AOT compilation is complete, configure the system to respond to subsequent requests associated with the application by executing the machine code.

2. The system of claim 1, wherein the first container and the second container are deployed within a cloud computing environment, and wherein the first container and the second container are both deployed in response to a deployment request from a client device communicatively coupled to the cloud computing environment.

3. The system of claim 2, wherein the memory device further includes instructions that are executable by the processing device for causing the processing device to:
determine that a request associated with the application has not been received within a predetermined time interval;
based on determining that the request has not been received within the predetermined time interval, determine if AOT compilation is complete; and
in response to determining that AOT compilation is complete:
shut down the first container; and
configure the system to respond to the subsequent requests associated with the application by executing the application in a container using the machine code generated via AOT compilation.

4. The system of claim 3, wherein configuring the system to respond to the subsequent requests using the machine code comprises overwriting a first container image in a datastore with a second container image, wherein the first container image comprises the intermediate code and the second container image comprises the machine code, and wherein the system is configured to use whichever container image is stored in the datastore to deploy the application.

5. The system of claim 3, wherein the memory device further includes instructions that are executable by the processing device for causing the processing device to, subsequent to shutting down the first container:
receive one or more requests associated with the application; and
in response to the one or more requests, execute the application in the container using the machine code generated via AOT compilation.

6. The system of claim 2, wherein the memory device further includes instructions that are executable by the processing device for causing the processing device to:
determine that a request associated with the application has not been received within a predetermined time interval;
based on determining that the request has not been received within the predetermined time interval, determine whether or not AOT compilation is complete; and
in response to determining that AOT compilation is not complete, continue to execute the application in the first container using JIT compilation.

7. The system of claim 2, wherein:
the first container is deployed on a first node in the cloud computing environment and the second container is deployed on a second node in the cloud computing environment, the second node being different from the first node; and
the program code is source code or bytecode for the application.

8. A method comprising:
deploying, by a processing device of a system, an application in a first container for responding to requests associated with the application, wherein the first container is configured to execute the application at least in part by performing just-in-time (JIT) compilation in which intermediate code for the application is compiled at runtime;
while the application is deployed within the first container, compiling, by the processing device, program code for the application in a second container by performing ahead-of-time (AOT) compilation in which the program code is compiled into machine code prior to runtime; and
based on determining that AOT compilation is complete, configuring, by the processing device, the system to respond to subsequent requests associated with the application by executing the machine code.

9. The method of claim 8, wherein the first container and the second container are deployed within a cloud computing environment, and wherein the first container and the second container are both deployed in response to a deployment request from a client device communicatively coupled to the cloud computing environment.

10. The method of claim 9, further comprising:
determining that a request associated with the application has not been received within a predetermined time interval;
based on determining that the request has not been received within the predetermined time interval, determining if AOT compilation is complete; and
in response to determining that AOT compilation is complete:
shutting down the first container; and
configuring the system to respond to the subsequent requests associated with the application by executing the application in a container using the machine code generated via AOT compilation.

11. The method of claim 10, wherein configuring the system to respond to the subsequent requests using the machine code comprises overwriting a first container image in a datastore with a second container image, wherein the first container image comprises the intermediate code and the second container image comprises the machine code, and wherein the system is configured to use whichever container image is stored in the datastore to deploy the application.

12. The method of claim 10, further comprising, subsequent to shutting down the first container:
receiving one or more requests associated with the application; and in response to the one or more requests, executing the application in the container using the machine code generated via AOT compilation.

13. The method of claim 9, further comprising:
determining that a request associated with the application has not been received within a predetermined time interval;
based on determining that the request has not been received within the predetermined time interval, determining whether or not AOT compilation is complete; and
in response to determining that AOT compilation is not complete, continuing to execute the application in the first container using JIT compilation.

14. The method of claim 9, wherein:
the first container is deployed on a first node in the cloud computing environment and the second container is deployed on a second node in the cloud computing environment, the second node being different from the first node; and
the program code is source code or bytecode for the application.

15. A non-transitory computer-readable medium comprising instructions that are executable by a processing device of a system for causing the processing device to:
deploy an application in a first container for responding to requests associated with the application, wherein the first container is configured to execute the application at least in part by performing just-in-time (JIT) compilation in which intermediate code for the application is compiled at runtime;
while the application is deployed within the first container, compile program code for the application in a second container by performing ahead-of-time (AOT) compilation in which the program code is compiled into machine code prior to runtime; and
based on determining that AOT compilation is complete, configure the system to respond to subsequent requests associated with the application by executing the machine code.

16. The non-transitory computer-readable medium of claim 15, wherein the first container and the second container are deployed within a cloud computing environment, and wherein the first container and the second container are both deployed in response to a deployment request from a client device communicatively coupled to the cloud computing environment.

17. The non-transitory computer-readable medium of claim 15, further comprising instructions that are executable by the processing device for causing the processing device to:
determine that a request associated with the application has not been received within a predetermined time interval;
based on determining that the request has not been received within the predetermined time interval, determine if AOT compilation is complete; and
in response to determining that AOT compilation is complete:
shut down the first container; and
configure the system to respond to the subsequent requests associated with the application by executing the application in a container using the machine code generated via AOT compilation.

18. The non-transitory computer-readable medium of claim 17, wherein configuring the system to respond to the subsequent requests using the machine code comprises overwriting a first container image in a datastore with a second container image, wherein the first container image comprises the intermediate code and the second container image comprises the machine code.

19. The non-transitory computer-readable medium of claim 17, further comprising instructions that are executable by the processing device for causing the processing device to, subsequent to shutting down the first container:
receive one or more requests associated with the application; and
in response to the one or more requests, execute the application in the container using the machine code generated via AOT compilation.

20. The non-transitory computer-readable medium of claim 15, wherein:
the first container is deployed on a first node in a computing environment and the second container is deployed on a second node in the computing environment, the second node being different from the first node; and
the program code is source code or bytecode for the application.

* * * * *